No. 854,239. PATENTED MAY 21, 1907.
C. F. RIGBY.
HYDRAULIC PACKING.
APPLICATION FILED SEPT. 26, 1906.

Witnesses:
Inventor
C. F. Rigby,

UNITED STATES PATENT OFFICE.

CLARK F. RIGBY, OF NEW MARTINSVILLE, WEST VIRGINIA.

HYDRAULIC PACKING.

No. 854,239.  Specification of Letters Patent.  Patented May 21, 1907.

Application filed September 26, 1906. Serial No. 336,243.

*To all whom it may concern:*

Be it known that I, CLARK F. RIGBY, a citizen of the United States, residing at New Martinsville, in the county of Wetzel and State of West Virginia, have invented certain new and useful Improvements in Hydraulic Packing, of which the following is a specification, reference being had therein to the accompanying drawing.

This invention relates to an improvement in metallic rod packing, and the object is to so arrange and combine split rod-embracing rings with soft metal as to provide a packing which, while adopted for general use, is designed especially for high pressure cylinders.

Figure 1:
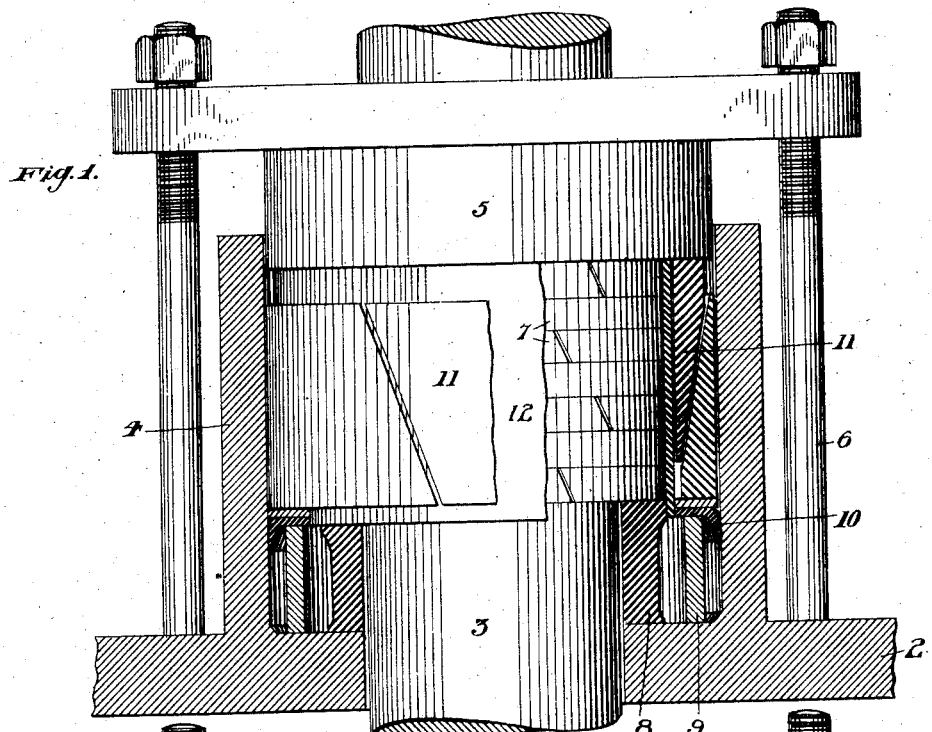
Figure 2:
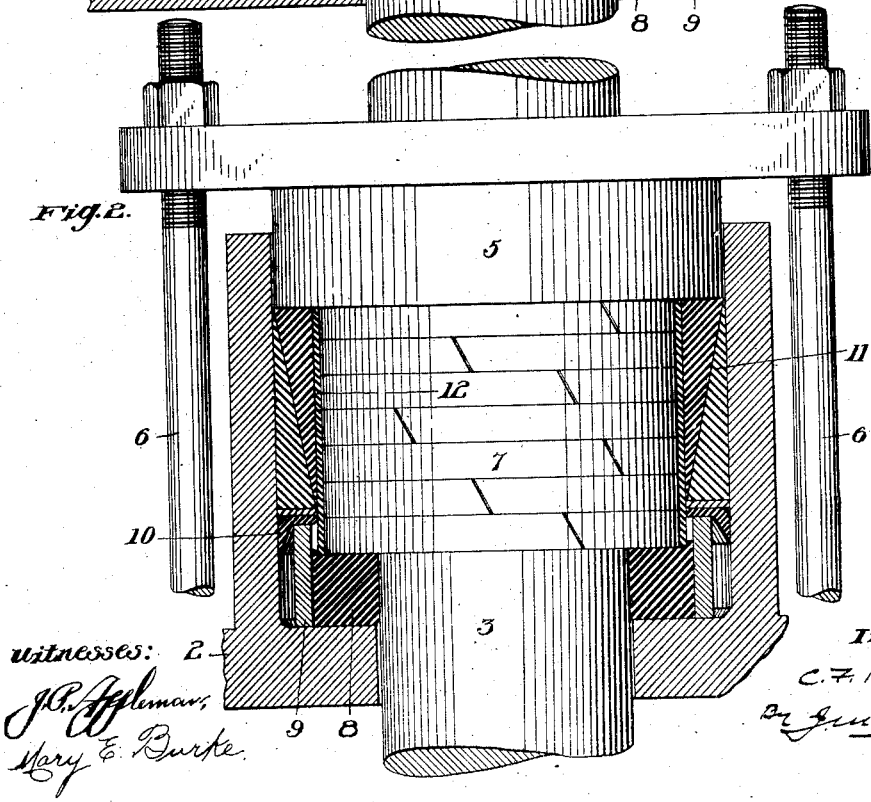

In the accompanying drawing, Figure 1 is a vertical section view of the packing before being adjusted or tightened up on the rod, and Fig. 2 is a similar view showing the same adjusted.

Referring to the drawings, 2 designates the cylinder-head or other wall of the chamber through which rod or piston 3 moves.

4 is the stuffing box, 5 the gland, and 6 the gland studs.

Encircling rod 3 is a series of split metal rings 7, the outer or upper end of which is engaged by gland 5, while its inner end bears against the soft metal rod-embracing annulus 8 seated in the inner end of the stuffing box. Before being compressed annulus 8 is of substantially the same diameter as rings 7. Also seated in the inner end of the stuffing box and encircling annulus 8, but spaced therefrom, is the non-compressible annular seat 9, which is also spaced slightly from the wall of box 4. Resting on the outer or upper end of this annular seat is the cup-shaped ring 10, formed preferably of leather with its edge or flange turned inwardly and closely fitting the wall of box 4. Bearing against ring 10 is the split annular two-part sleeve 11, formed preferably of a compressible metal.

The engaging faces of the parts of sleeve 11 are sloping or inclined, thereby facilitating the longitudinal compression and consequent lateral expansion of the sleeve. As a further precaution against leakage, I have inserted a relatively thin soft metal casing 12 between sleeve 11 and the split packing rings, thus completely and fully enveloping the latter.

In operation, the soft metal sleeve 11 is contracted by the inward movement of gland 5 and the space between the split rod rings and the box wall is fully filled with the laterally expanded and longitudinally contracted soft metal sleeve. At the same time, annulus 8 is compressed by the inward movement of rings 7, filling the space between the rod and annular seat 9, and causing the rod to be embraced at that point by a soft metal which in conjunction with split rings 7 forms a most effective seat. The cup-shaped ring 10 holds in check any fluid that may escape outwardly past rod 3 beneath rings 7, the presence of such escaping fluid operating to expand the inturned flange of the cup-ring which prevents the fluid from passing out along the wall of the stuffing box.

I claim:—

1. In a rod packing, the combination with a stuffing box and a gland, of a series of packing rings, and a compressible rod-embracing annulus within the box and forming an inner abutment for the rings and adapted to be compressed thereby.

2. In a rod packing, the combination with a stuffing box and a gland, of a series of split rod-embracing rings, a two-part sleeve interposed between the rings and box, the parts of said sleeve overlapping each other and having diagonal engaging faces.

3. In a rod packing, the combination with a stuffing box and a gland, of a series of split rod-embracing rings, a compressible sleeve interposed between the rings and the stuffing box, a yielding inner abutment for the packing rings, and an unyielding inner abutment for the compressible sleeve.

4. In a rod packing, the combination with a stuffing box and a gland, of a series of split rod-embracing rings, a soft metal abutment in the inner end of the box for the rings, a compressible sleeve interposed between the rings and the side wall of the box, and a non-compressible seat inclosing said compressible abutment and itself forming an abutment for the inner end of said sleeve.

5. In a rod packing, the combination with a stuffing box and a gland, of a series of split rod-embracing rings, a compressible abutment for the inner end of the series of rings, an annular non-compressible device inclosing the compressible abutment, a split two-part sleeve between said rings and the wall of the stuffing box and bearing at its inner end against said annular device, the sleeve being formed of compressible metal and the engaging faces of the parts thereof sloping or inclined.

6. In a rod packing, the combination with a stuffing box and a gland, of a series of split rod-embracing rings, a relatively thin casing inclosing the rings, and a laterally expansible and longitudinally contractible sleeve interposed between the casing and the wall of the stuffing box.

7. In a rod packing, the combination with a stuffing box and a gland, of a series of split rod-embracing rings, a laterally expansible and longitudinally contractible sleeve between the rings and the stuffing box, an annular seat at the inner end of and of less diameter than the stuffing box and forming an abutment for said sleeve, and a flexible cup-shaped ring interposed between said seat and sleeve and closely fitting within the stuffing box.

8. In a rod packing, the combination with a stuffing box and a gland; of a series of split rod-embracing rings, a soft metal abutment for the inner end of the ring-series, an annular non-compressible device surrounding the soft metal abutment and of less diameter than the interior of the stuffing box, a soft metal sleeve interposed between the rings and the wall of the stuffing box, and a flexible cup-shaped ring between said sleeve and said non-compressible device, the flexible ring closely fitting the stuffing box and having its flange or edge extending inward toward the inner end of the box.

In testimony whereof I affix my signature in presence of two witnesses.

CLARK F. RIGBY.

Witnesses:
  B. E. RIGBY,
  L. I. LEONARD.